US009403625B2

(12) United States Patent
Lembke et al.

(10) Patent No.: US 9,403,625 B2
(45) Date of Patent: Aug. 2, 2016

(54) BOTTLE

(71) Applicants: Tropicana Products, Inc., Chicago, IL (US); Graham Packaging Company, L.P., York, PA (US)

(72) Inventors: Bryan J. Lembke, Crystal Lake, IL (US); Raymond A. Pritchett, Jr., Manchester, PA (US); Matthew A. Russell, Red Lion, PA (US)

(73) Assignees: Tropicana Products, Inc., Chicago, IL (US); Graham Packaging Company, L.P., York, PA (US)

( * ) Notice: Subject to any disclaimer, the term of this patent is extended or adjusted under 35 U.S.C. 154(b) by 247 days.

(21) Appl. No.: 13/750,733

(22) Filed: Jan. 25, 2013

(65) Prior Publication Data
US 2013/0140263 A1 Jun. 6, 2013

Related U.S. Application Data

(63) Continuation-in-part of application No. 12/781,475, filed on May 17, 2010, now abandoned, and a continuation-in-part of application No. 12/552,375, filed on Sep. 2, 2009, now abandoned, which is a
(Continued)

(51) Int. Cl.
*B65D 23/00* (2006.01)
*B65D 1/02* (2006.01)
(Continued)

(52) U.S. Cl.
CPC .............. *B65D 23/00* (2013.01); *B65D 1/0276* (2013.01); *B29K 2023/065* (2013.01);
(Continued)

(58) Field of Classification Search
CPC ............. B65D 1/02; B65D 2501/0036; B65D 1/0223; B65D 2501/0081; B65D 23/00; B65D 1/0276; B65D 2501/0045; B29K 2023/065; B29K 2067/003
See application file for complete search history.

(56) References Cited

U.S. PATENT DOCUMENTS

D67,463 S * 6/1925 Johnson ......................... D9/557
D93,724 S * 10/1934 Key ............................... D9/550
(Continued)

FOREIGN PATENT DOCUMENTS

GB 2161133 1/1986
GB 2161133 A * 1/1986 ............... B65D 1/44
(Continued)

OTHER PUBLICATIONS

Canadian Office Action dated Aug. 20, 2013 from CA Application No. 2,704,333.
(Continued)

*Primary Examiner* — Tri Mai
(74) *Attorney, Agent, or Firm* — Sterne, Kessler, Goldstein & Fox P.L.L.C.

(57) ABSTRACT

A bottle includes a neck portion having an opening configured to permit filling and emptying of the bottle, a shoulder portion connected to a lower end of the neck portion, a sidewall connected to a lower end of the shoulder portion and extending vertically downward from the shoulder portion, and a base connected to a lower end of the sidewall and forming a bottom surface of the bottle. The sidewall has a plurality of annular ribs extending around a periphery of the sidewall. Each of the annular ribs includes a plurality of sequential enlarged portions interconnected by bridges, with each of the enlarged portions having a vertical width that is greater than a vertical width of each of the bridges.

21 Claims, 14 Drawing Sheets

Related U.S. Application Data continuation-in-part of application No. 29/335,849, filed on Apr. 23, 2009, now Pat. No. Des. 631,753.

(60) Provisional application No. 61/178,824, filed on May 15, 2009.

(51) Int. Cl.
    *B29K 23/00*      (2006.01)
    *B29K 67/00*      (2006.01)

(52) U.S. Cl.
    CPC .. *B29K 2067/003* (2013.01); *B65D 2501/0036* (2013.01); *B65D 2501/0045* (2013.01); *B65D 2501/0081* (2013.01)

(56) References Cited

U.S. PATENT DOCUMENTS

| | | | | |
|---|---|---|---|---|
| D113,862 S | * | 3/1939 | Ansell | D9/544 |
| D186,472 S | * | 10/1959 | Wunderly | D9/543 |
| D307,393 S | * | 4/1990 | Conrad | D9/528 |
| 5,054,632 A | | 10/1991 | Alberghini et al. | |
| D324,822 S | | 3/1992 | Brabeck et al. | |
| 5,122,327 A | | 6/1992 | Spina et al. | |
| 5,238,129 A | | 8/1993 | Ota | |
| 5,704,503 A | * | 1/1998 | Krishnakumar et al. | 215/381 |
| 5,740,934 A | | 4/1998 | Brady | |
| 5,746,339 A | | 5/1998 | Petre et al. | |
| 6,036,037 A | | 3/2000 | Scheffer et al. | |
| 6,062,408 A | * | 5/2000 | Beck et al. | 215/379 |
| 6,112,925 A | * | 9/2000 | Nahill et al. | 215/382 |
| 6,149,024 A | | 11/2000 | Deemer et al. | |
| 6,497,333 B1 | | 12/2002 | Ellis et al. | |
| 6,581,794 B2 | * | 6/2003 | Boukobza | 215/383 |
| 6,857,531 B2 | | 2/2005 | Slat et al. | |
| D502,405 S | | 3/2005 | Dorn et al. | |
| D506,142 S | * | 6/2005 | Gauthier | D9/560 |
| D514,947 S | | 2/2006 | Darr et al. | |
| 7,032,770 B2 | | 4/2006 | Finlay et al. | |
| D525,139 S | | 7/2006 | Livingston et al. | |
| D527,648 S | | 9/2006 | Darr et al. | |
| 7,213,719 B2 | * | 5/2007 | Pedmo et al. | 215/381 |
| 7,243,808 B2 | | 7/2007 | Livingston et al. | |
| D560,506 S | | 1/2008 | Lepoitevin | |
| D566,572 S | | 4/2008 | Darr et al. | |
| D631,753 S | | 2/2011 | Russell et al. | |
| 2003/0010743 A1 | * | 1/2003 | Boukobza | 215/382 |
| 2010/0006533 A1 | * | 1/2010 | Nievierowski et al. | 215/381 |
| 2010/0270259 A1 | | 10/2010 | Russell et al. | |

FOREIGN PATENT DOCUMENTS

| | | | | |
|---|---|---|---|---|
| JP | 09240647 A | * | 9/1997 | B65D 1/02 |
| JP | 2000127231 A | * | 5/2000 | B29C 49/08 |

OTHER PUBLICATIONS

Heat-Tek BRICK Hot Fill PET Bottles, catalog page, known at least as early as May 1, 2009, 2 pp., Ball.

* cited by examiner

BOTTLE

CROSS-REFERENCE TO RELATED APPLICATION

This application is a continuation-in-part of co-pending U.S. patent application Ser. No. 12/781,475, filed May 17, 2010, which claims priority to U.S. Provisional Patent Application No. 61/178,824, filed on May 15, 2009, and this application is also a continuation-in-part of co-pending U.S. patent application Ser. No. 12/552,375, filed Sep. 2, 2009, which is a continuation-in-part of U.S. Design patent application Ser. No. 29/335,849, filed Apr. 23, 2009, and issued as U.S. Design Pat. No. D631,753 on Feb. 1, 2011, all of which patents and applications are incorporated by reference herein in their entireties and made part hereof.

TECHNICAL FIELD

The invention relates generally to a bottle suitable for use in steam sterilization processes, and more specifically, to a bottle having structures that can provide sufficient strength to allow a recycled PET bottle to be used in steam sterilization.

BACKGROUND

Steam rinse sterilization processes are often used on bottles and other containers, including those made of HDPE and other polymers. Such sterilization processes, for example using a WAB peroxide steam rinser, often result in the bottles reaching temperatures of 75-85° C. This temperature coincides with the glass transition temperature of PET, as shown in FIG. 8, and the modulus of PET changes rapidly throughout this temperature range, as shown in FIG. 9. As a result, the physical stability of PET bottles decreases and becomes unpredictable and inconsistent, resulting in shrinkage and/or deformation of the bottles. Thus, the use of PET bottles in steam sterilization processes can present difficulties. The use of recycled PET (rPET) increases the unpredictability and inconsistency of the physical properties, as the intrinsic viscosities of recycled materials typically exhibit greater variation. Additionally, certain deformation characteristics are more difficult to control in square or other non-cylindrical bottles, and controlling shrinkage of the bottle becomes more important as a result.

The present device and method are provided to address the problems discussed above and other problems, and to provide advantages and aspects not provided by prior bottles and other containers of this type. A full discussion of the features and advantages of the present invention is deferred to the following detailed description, which proceeds with reference to the accompanying drawings.

BRIEF SUMMARY

Aspects of the present invention relate to a bottle that includes a neck portion having an opening configured to permit filling and emptying of the bottle, a shoulder portion connected to a lower end of the neck portion, a sidewall connected to a lower end of the shoulder portion and extending vertically downward from the shoulder portion, and a base connected to a lower end of the sidewall and forming a bottom surface of the bottle. The sidewall has a plurality of annular ribs extending around a periphery of the sidewall. Each of the annular ribs includes a plurality of sequential enlarged portions interconnected by bridges, with each of the enlarged portions having a vertical width that is greater than a vertical width of each of the bridges.

According to one aspect, the sidewall further includes recessed lands located between the annular ribs.

According to another aspect, a first rib of the plurality of ribs is staggered in relation to at least one adjacent second rib of the plurality of ribs, such that the enlarged portions of the first rib are vertically offset from the enlarged portions of the second rib, and the bridges of the first rib are vertically offset from the bridges of the second rib. In one embodiment, the first and second ribs may be staggered such that the enlarged portions of the first rib are vertically centered in relation to the bridges of the second rib and the enlarged portions of the second rib are vertically centered in relation to the bridges of the first rib. In another embodiment, all of the plurality of ribs may be arranged in an alternating, staggered arrangement, such that the enlarged portions and the bridges of each rib are vertically offset from the enlarged portions and the bridges, respectively, of each adjacent rib, and such that the enlarged portions and the bridges of each rib are vertically centered in relation to the bridges and the enlarged portions, respectively, of each adjacent rib. The plurality of ribs may form a bricklike pattern in this embodiment.

According to a further aspect, the enlarged portions of the ribs are generally rectangular in shape.

According to yet another aspect, the sidewall of the bottle has a generally square cross-section and is formed by four generally flat panels connected by four rounded corners. The plurality of ribs are staggered, such that each rib of a first group of the ribs has one of the enlarged portions vertically aligned with each of the four corners, and each rib of a second group of the ribs has one of the bridges vertically aligned with each of the four corners. In one embodiment, the first group of ribs and the second group of ribs are arranged in an alternating arrangement.

According to a still further aspect, the bottle is manufactured using a blow molding process, from a material that includes at least some recycled PET, and is capable of exhibiting a dimensional stability of less than 1% dimensional change during a WAB steam sterilization process in which the bottle reaches temperatures in the range of 75-85° C.

According to other aspects, a thickness of each of the panels is between 0.01 and 0.02 inches, and the bottle is configured such that when a normal force less than 1.65 lbf is applied to a center of a surface of at least one of the panels, the surface is not displaced at least ¼ of an inch toward a longitudinal axis of the container.

Additional aspects of the invention relate to a bottle that includes a base that forms a lowermost surface of the bottle, an opening proximate a top of the bottle, spaced vertically from the base, configured to permit filling and emptying of the bottle, and a sidewall extending vertically upward at least a portion of a vertical distance from the base to the opening. The sidewall is formed by four generally flat panel sections connected by four rounded corners. The sidewall has a plurality of annular ribs extending around a periphery of the sidewall. Each of the annular ribs includes a plurality of sequential enlarged portions interconnected by bridges, with each of the enlarged portions having a vertical width that is greater than a vertical width of each of the bridges. A first rib of the plurality of ribs is staggered in relation to at least one adjacent second rib of the plurality of ribs, such that the enlarged portions of the first rib are vertically centered in relation to the bridges of the second rib and the enlarged portions of the second rib are vertically centered in relation to the bridges of the first rib, and such that first rib has one of the enlarged portions vertically aligned with each of the four corners and the second rib has one of the bridges vertically aligned with each of the four corners.

According to one aspect, the sidewall further includes recessed lands located between the annular ribs.

According to another aspect, all of the plurality of ribs are arranged in an alternating, staggered arrangement, such that the enlarged portions and the bridges of each rib are vertically offset from the enlarged portions and the bridges, respectively, of each adjacent rib to form a brick-like pattern.

According to a further aspect, the enlarged portions of the ribs are generally rectangular in shape.

According to yet another aspect, all of the plurality of ribs are arranged in an alternating, staggered arrangement, such that the enlarged portions and the bridges of each rib are vertically centered in relation to the bridges and the enlarged portions, respectively, of each adjacent rib, and such that the plurality of ribs form an alternating pattern at each of the four corners where the enlarged portions and the bridges of alternating ribs are vertically aligned with each respective corner.

According to a still further aspect, the bottle is manufactured using a blow molding process, from a material that includes at least some recycled PET, and is capable of exhibiting a dimensional stability of less than 1% dimensional change during a WAB steam sterilization process where the bottle reaches temperatures in the range of 75-85° C.

Further aspects of the invention relate to a bottle that includes a neck portion having an opening configured to permit filling and emptying of the bottle, a shoulder portion connected to a lower end of the neck portion, a sidewall connected to the lower end of the shoulder portion and extending vertically downward from the shoulder portion, and a base connected to a lower end of the sidewall and forming a bottom surface of the bottle. The shoulder portion has a tapered configuration that tapers from a narrower top end with a generally circular cross-sectional shape to a wider bottom end with a generally square cross-sectional shape, and the sidewall has a generally square cross-sectional shape formed by four generally flat panel sections connected by four rounded corners. The sidewall has a plurality of raised, annular ribs extending around a periphery of the sidewall. Each of the annular ribs includes a plurality of sequential, generally rectangular enlarged portions interconnected by bridges, each of the enlarged portions having a vertical width that is greater than a vertical width of each of the bridges. The ribs are further separated by recessed lands located between the ribs. All of the plurality of ribs are arranged in an alternating, staggered arrangement, such that the enlarged portions and the bridges of each rib are vertically centered in relation to the bridges and the enlarged portions, respectively, of each adjacent rib, and such that the plurality of ribs form an alternating pattern at each of the four corners where the enlarged portions and the bridges of alternating ribs are vertically aligned with each respective corner.

According to one aspect, the bottle is manufactured using a blow molding process, from a material that includes at least some recycled PET, and is capable of exhibiting a dimensional stability of less than 1% dimensional change during a WAB steam sterilization process where the bottle reaches temperatures in the range of 75-85° C.

Still further aspects of the invention relate to a method of blow molding a bottle as described above, and a method of sterilizing a bottle as described above. The method of sterilizing may include conducting a WAB steam sterilization process on the bottle, which process reaches temperatures in the range of 75-85° C. The bottle may exhibit a dimensional stability of less than 1% dimensional change during the WAB steam sterilization process.

Other aspects of the invention relate to a bottle that includes a top portion, a body having a plurality of panels located below the top portion, and a base located below the body. At least one of the plurality of panels includes a first brick portion, a second brick portion and a third brick portion, where a first end of the first brick portion and a second end of the second brick portion are located proximate to each other, and a center portion of a side edge of the third brick portion is located proximate to the first end of the first brick portion and the second end of the second brick portion. The first, second, and third brick portions may be identical or substantially identical in size and shape.

According to one aspect, each of the first, second, and third brick portions are discrete from each other.

According to another aspect, the at least one of the panels further includes a bridge connecting the first end of the first brick portion to the second end of the second brick portion. In one configuration, the first and second brick portions and the bridge are part of a first continuous rib extending around the bottle, and the third brick portion is part of a second continuous rib extending around the bottle, where the first rib is separated from the second rib by lands. The lands may be recessed with respect to the first and second ribs in one embodiment, and the first and second ribs may be recessed with respect to the lands in another embodiment.

Other features and advantages of the invention will be apparent from the following specification taken in conjunction with the following drawings.

BRIEF DESCRIPTION OF THE DRAWINGS

To allow for a more full understanding of the present invention, it will now be described by way of example, with reference to the accompanying drawings in which.

DETAILED DESCRIPTION

Figure 1:
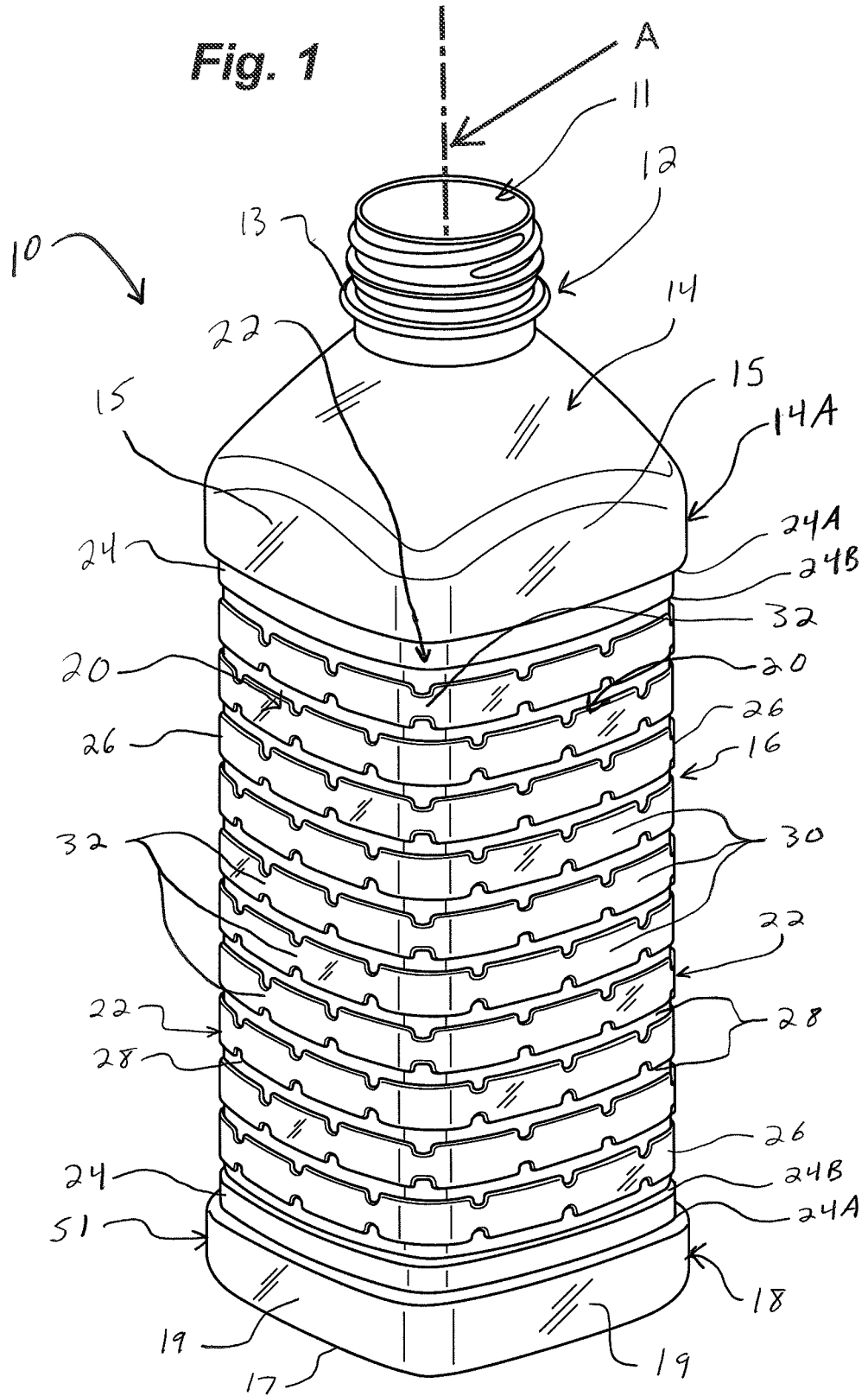
FIG. 1 is a perspective view of a bottle utilizing an embodiment of a rib pattern in accordance with aspects of the present invention.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention.

FIGS. 1-7 illustrate an exemplary embodiment of a bottle 10 according to aspects of the present invention. The bottle 10 includes a neck 12, a shoulder portion 14, a sidewall 16, and a base 18. The bottle 10 is generally square/rectangular in cross-section, and the sidewall 16 is defined by four generally flat panels 20 connected by rounded corners 22.

The neck 12 has a circular opening 11 for filling and emptying the bottle 10 (see FIG. 6), and is threaded for attachment of a cap (not shown) thereto, as is known in the art. The neck 12 also includes a flange 13 for supporting a cap ring (not shown) as also known in the art. In other embodiments, the features of the bottle 10, including the structure of the sidewall 16, can be utilized in bottles that have different types and configurations of openings for filling and emptying, as well as different types and configurations of closures for such openings, including flip-top lids, snap lids, peel-back lids, other types of lids, and/or combinations of such. For example, in one embodiment, the bottle 10 may include a peel-back portion in addition to the threaded cap. As another example, a bottle may have an opening that is not located at the top of the bottle, such as by having an opening in a side surface of the bottle.

The shoulder portion 14 expands the diameter of the bottle 10 from the narrower neck 12 to the wider sidewall 16. The shoulder portion 14 also creates a gradual transition from a round cross-section to the square/rectangular cross-section of the sidewall 16. The lower end 14A of the shoulder portion 14 is generally square in cross-section, having four flattened areas 15, and has at least one greater cross-sectional dimension than the sidewall 16. Each of the flattened areas 15 of the shoulder portion 14 is located directly above one of the panels 20 of the sidewall 16, described below. In the embodiment shown in FIGS. 1-7, the surfaces of the flattened areas 15 are parallel to the longitudinal axis A of the bottle 10. Additionally, in this embodiment, the lower end 14A of the shoulder portion 14, at the flattened areas 15, has a greater cross-sectional width, a greater cross-sectional perimeter, and a greater cross-sectional area measured perpendicular to the vertical axis of the bottle 10, relative to the sidewall 16. Viewed another way, the lower end 14A of the shoulder portion 14 extends further from the longitudinal axis A of the bottle 10 than the panels 20 of the sidewall 16, in the embodiment illustrated in FIGS. 1-7. In other embodiments, the features of the bottle 10, including the structure of the sidewall 16, can be utilized in bottles that have a differently-configured shoulder portion 14, or that have no identifiable shoulder portion.

The base 18 is located at the lower end of the sidewall 16, and includes a generally vertical, upstanding portion 51 and a bottom surface 50 forming the lowermost surface of the bottle 10. The base 18 also has a generally square/rectangular cross-section, having four flattened areas 19, and also has at least one greater cross-sectional dimension than the sidewall 16. Each of the flattened areas 19 of the base 18 is located directly below one of the panels 20 of the sidewall 16, described below. In this embodiment, the upstanding portion 51 of the base 18, at the flattened areas 19, has a greater cross-sectional width, a greater cross-sectional perimeter, and a greater cross-sectional area measured perpendicular to the vertical axis of the bottle 10, relative to the sidewall 16. The base 18 also includes a base shoulder 17 that transitions from the upstanding portion 51 to the bottom surface 50 of the bottle 10. The bottom surface 50 has a generally circular recess 52 with a curvilinear profile and a plurality of strengthening ribs 54 arranged in a radial formation at the center of the recess 52. In other embodiments, the features of the bottle 10, including the structure of the sidewall 16, can be utilized in bottles that have a differently-configured base, or that have no identifiable base below the sidewall.

The sidewall 16 is recessed from the shoulder portion 14 and the base 18, and has generally smaller cross-sectional dimensions in this embodiment. As described above, the sidewall 16 is generally square/rectangular in cross-section, having four generally flat panels 20 connected by rounded corners 22. The upper and lower ends of the sidewall 16 each include an annular shelf 24 forming transitions from the shoulder portion 14 and the base 18 to the recessed lands 28 of the sidewall 16, with each annular shelf 24 having a generally smooth outer surface that follows the contours of the panels 20 and corners 22. Each annular shelf 24 is separated from the shoulder portion 14 or the base 18, respectively, by a first annular shoulder 24A that forms a reduction in cross-sectional area from the shoulder portion 14 or the base 18 to the respective shelf 24. Further, each annular shelf 24 is separated from the recessed lands 28 of the sidewall 16 by a second annular shoulder 24B that forms a reduction in cross-sectional area from the respective shelf 24 to the adjacent recessed lands 28 of the sidewall 16.

The sidewall 16 also includes a plurality of annular ribs 26 extending around the perimeter of the bottle 10, formed as raised or embossed segments of the sidewall 16. The ribs 26 extend across each of the flat panels 20 and around each of the corners 22. The ribs 26 are separated by recessed lands 28, and the ribs 26 are raised with respect to the lands 28. In the embodiment illustrated in FIGS. 1-7, the lands 28 are completely separated from each other by the ribs 26. Each of the ribs 26 is formed in a brick-like configuration or pattern, having a plurality of sequential enlarged portions or brick portions 30 separated by narrower bridges 32. In the embodiment shown, the enlarged portions 30 are each formed in a generally rectangular configuration. However, in other embodiments, the enlarged portions 30 may have a different shape, including a square, tapered, or rounded shape. Additionally, the bridges 32 may have different configurations in other embodiments, such as a narrower or wider configuration. Alternately, the bridges 32 may be only intermittently present, such that one of the ribs 26 may have complete gaps or separations between two or more adjacent enlarged portions 30, and in one embodiment, the bridges 32 may be completely absent for one or more of the ribs 26. In such embodiments, at least some of the lands 28 may not be completely separated from each other. In another embodiment, additional vertical bridges may exist between two or more of the ribs 26 on the sidewall 16. In a further embodiment, the orientation of the embossed ribs 26 and the recessed lands 28 may be reversed, with the ribs 26 being recessed into the outer surface of the sidewall 16 and the lands 28 being raised above the ribs 26, as described below and illustrated in FIGS. 16-19.

Figure 2:
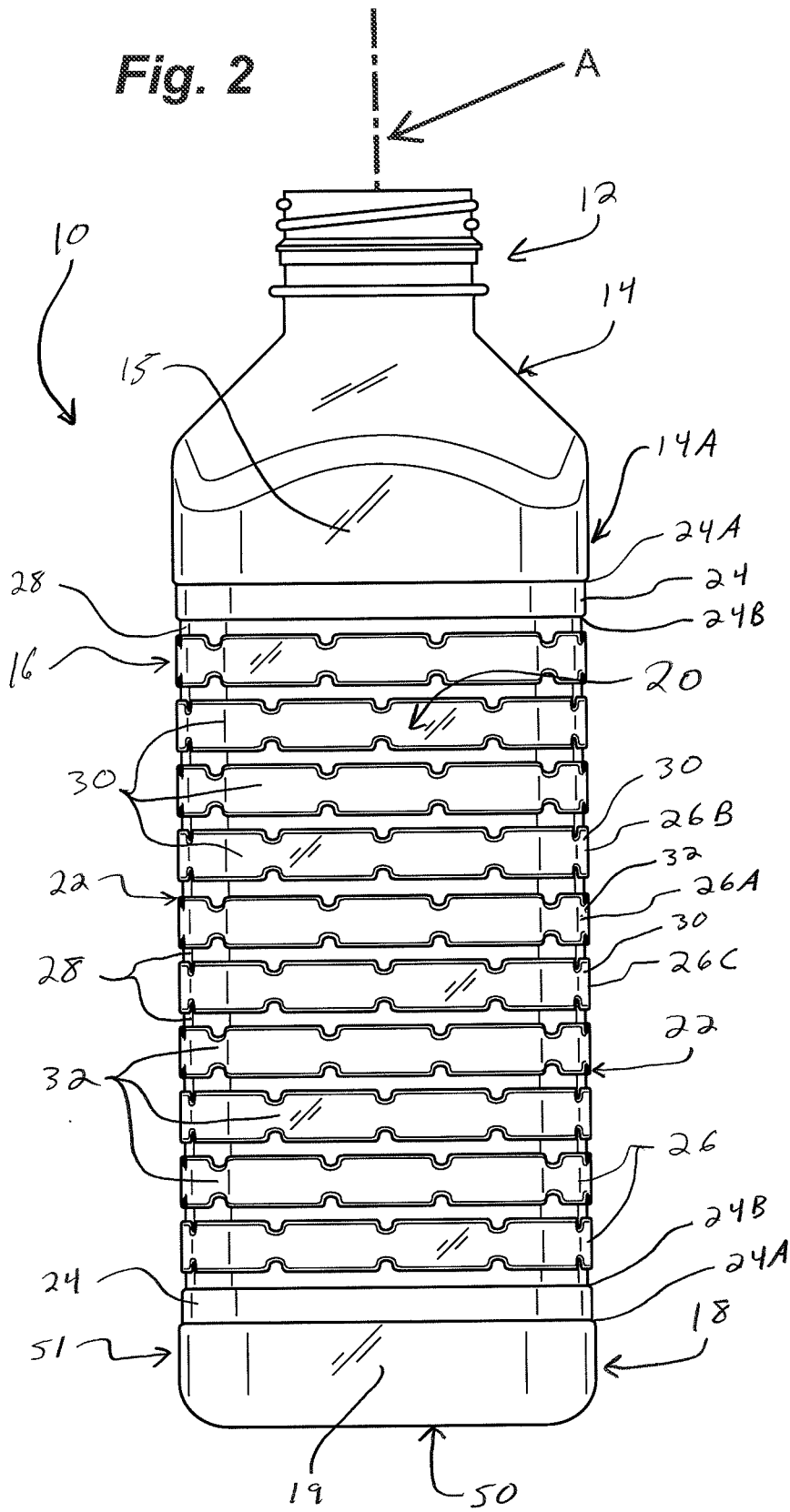
FIG. 2 is a front view of the bottle of FIG. 1.

In the embodiment shown in FIGS. 1-7, the ribs 26 are arranged in an alternating, staggered formation, such that adjacent ribs 26 are offset from each other. In other words, the enlarged portion 30 of a first rib 26A is offset from the enlarged portions 30 of the upper and/or lower adjacent ribs 26B, 26C, as shown in FIG. 2. In the embodiment illustrated, the bridges 32 of the first rib 26A are located in vertical alignment with the approximate midpoints of the enlarged portions 30 of the adjacent ribs 26B, 26C. Likewise, the bridges 32 of the adjacent ribs 26B, 26C are located in vertical alignment with the approximate midpoints of the enlarged portions 30 of the first rib 26A. Further, in this embodiment, the midpoints of the enlarged portions 30 and the bridges 32 of alternating ribs 26 are centered at the midpoints of each of the rounded corners 22, as best seen in FIG. 1. Phrased another way, in one embodiment, the brick-like configuration or brick pattern may include at least two enlarged portions 30 or other rib elements of approximately equal length and width, wherein two ends of the enlarged portions 30 or other rib elements are proximate to each other and a center portion of one of the side edges of a third enlarged portion 30 or other rib element is positioned proximate to the location where the two ends of the first two enlarged portions 30 are the closest. It is understood that the bottle 10 is shown as a thin-wall, blow molded bottle 10, and that the internal surfaces of the bottle 10 are generally mirror-images of the external surfaces. It is also understood that features of the bottle 10 may be useful in other types of bottles, such as bottles having thicker walls.

Viewed another way, the sidewall 16 may be described as having an arrangement of staggered ribs 26, such that the ribs 26 form an alternating pattern at each of the four corners 22 where the enlarged portions 30 and the bridges 32 of alternating ribs 26 are vertically aligned with each respective corner 22. In one embodiment, the enlarged portions 30 of a first group of the ribs 26 (e.g. 26A) are vertically aligned with each of the four corners 22, and the bridges 32 of a second group of the ribs 26 (e.g. 26B, 26C) are vertically aligned with each of the four corners 22. The first and second groups of ribs 26 may be arranged in an alternating pattern, as described above. Such an alternating pattern may be described as an A-B-A-B repeating pattern, with "A" signifying said first group of ribs 26 (e.g. 26A) and "B" signifying said second group of ribs 26 (e.g. 26B, 26C). In another embodiment, the ribs 26 may be arranged in an alternating pattern, but each rib 26 may not have only bridges 32 or enlarged portions 30 aligned with the corners 22. For example, each rib 26 may have two bridges 32 aligned with two of the corners 22 and two enlarged portions 30 aligned with the other two corners 22, in alternating arrangement. In this embodiment, each corner 22 will still have an alternating bridge 32/enlarged portion 30 pattern progressing vertically down the corner 22, with opposite corners 22 having identical alternating patterns and adjacent corners 22 having opposite alternating patterns 22.

The degree of offset or staggering of the ribs 26 can be different in other embodiments. For example, in one embodiment, the sidewall 16 may include three or four different staggered rib configurations, such that the ribs 26 alternate in an A-B-C-A-B-C pattern or an A-B-C-D-A-B-C-D pattern, among other embodiments. In a further embodiment, the ribs 26 may not be staggered or offset from each other, or may be randomly staggered on the sidewall 16.

The sidewall 16 is also configured to have a label (not shown) attached thereto. The large, flat surface area provided by the plurality of enlarged portions 30 of the ribs 26 and the surfaces of the annular shelves 24 provide sufficient area for attachment of such a label, for example by using an adhesive. Additionally, the overhang of the lower end 14A of the shoulder portion 14 may assist in avoiding damage to the label when it is placed on the sidewall 16.

Figure 3:
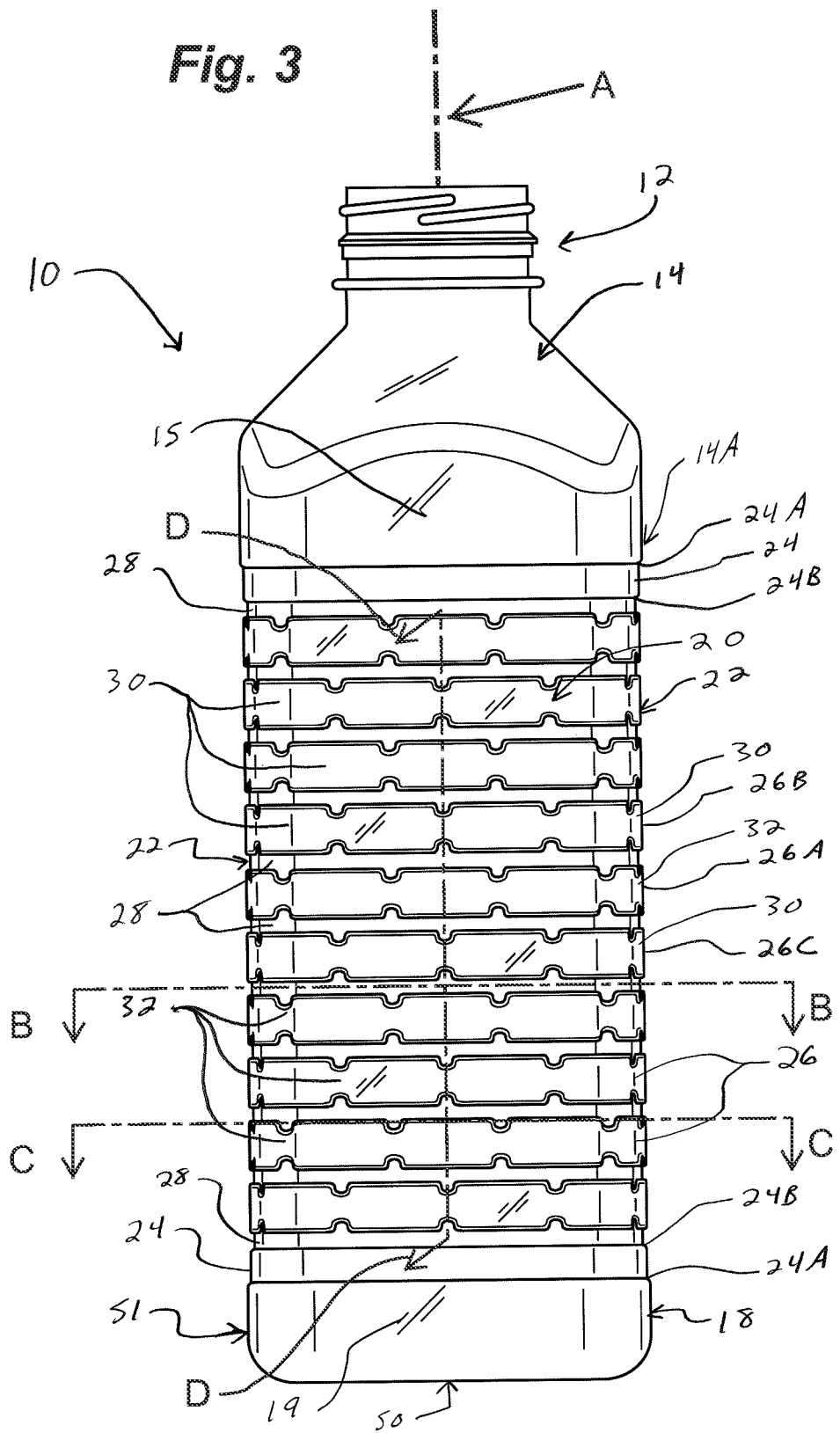
FIG. 3 is a right view of the bottle of FIG. 1.
Figure 4:
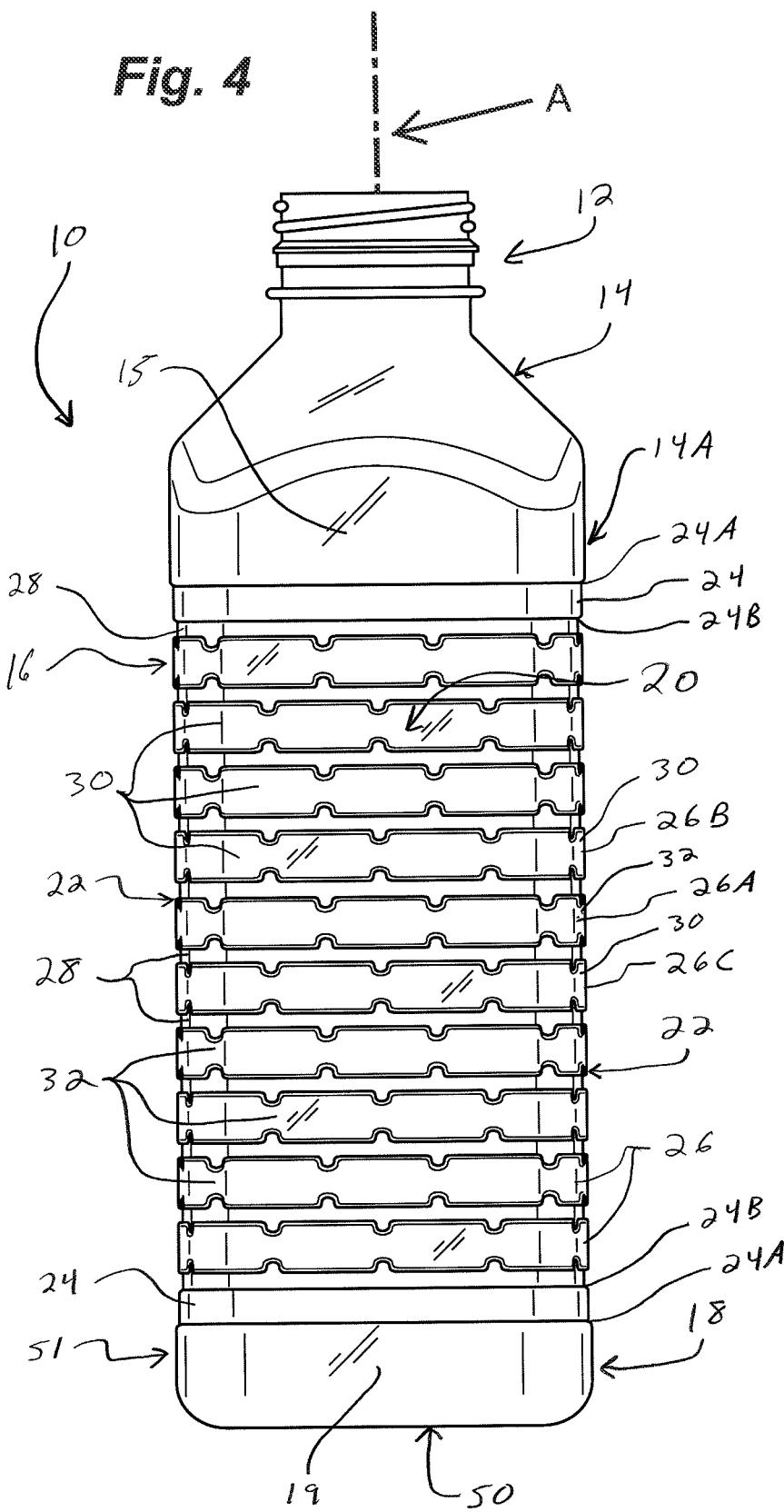
FIG. 4 is a rear side view of the bottle of FIG. 1.
Figure 5:
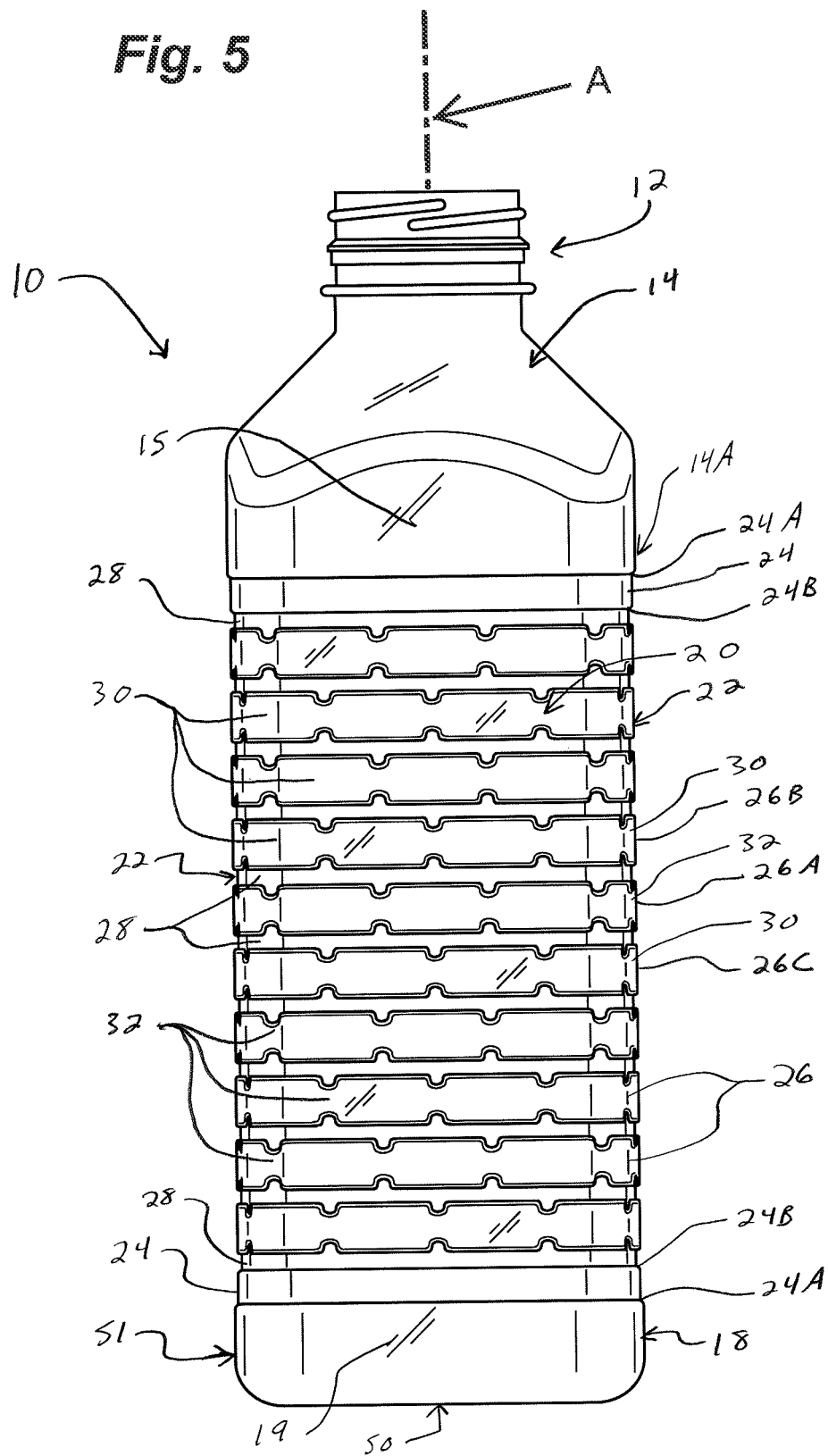
FIG. 5 is a left side view of the bottle of FIG. 1.
Figure 6:
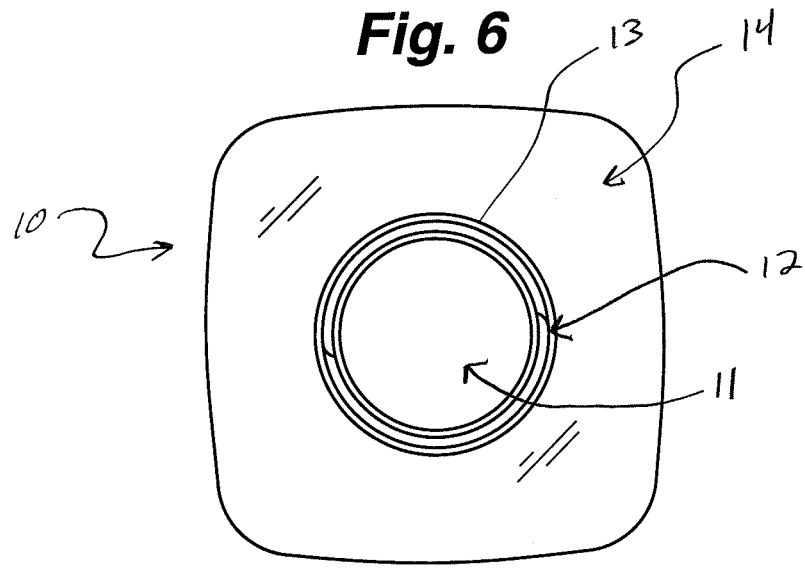
FIG. 6 is a top view of the bottle of FIG. 1.
Figure 7:
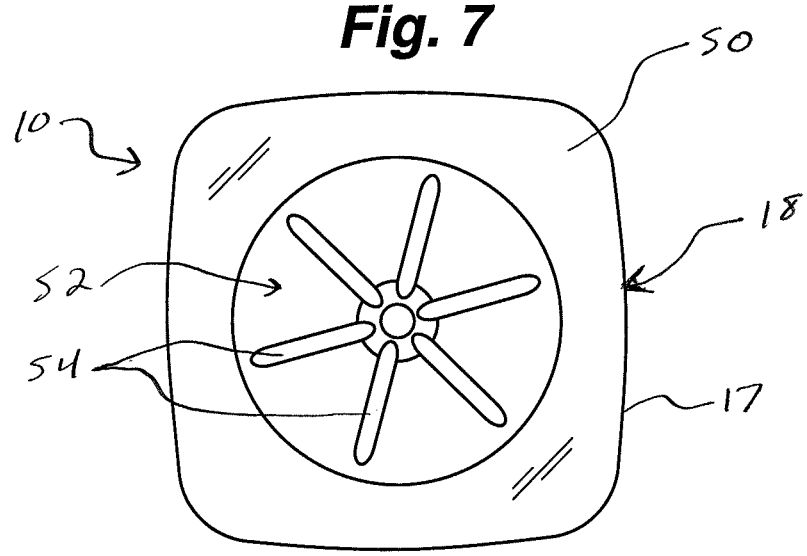
FIG. 7 is a bottom view of the bottle of FIG. 1.
Figure 8:
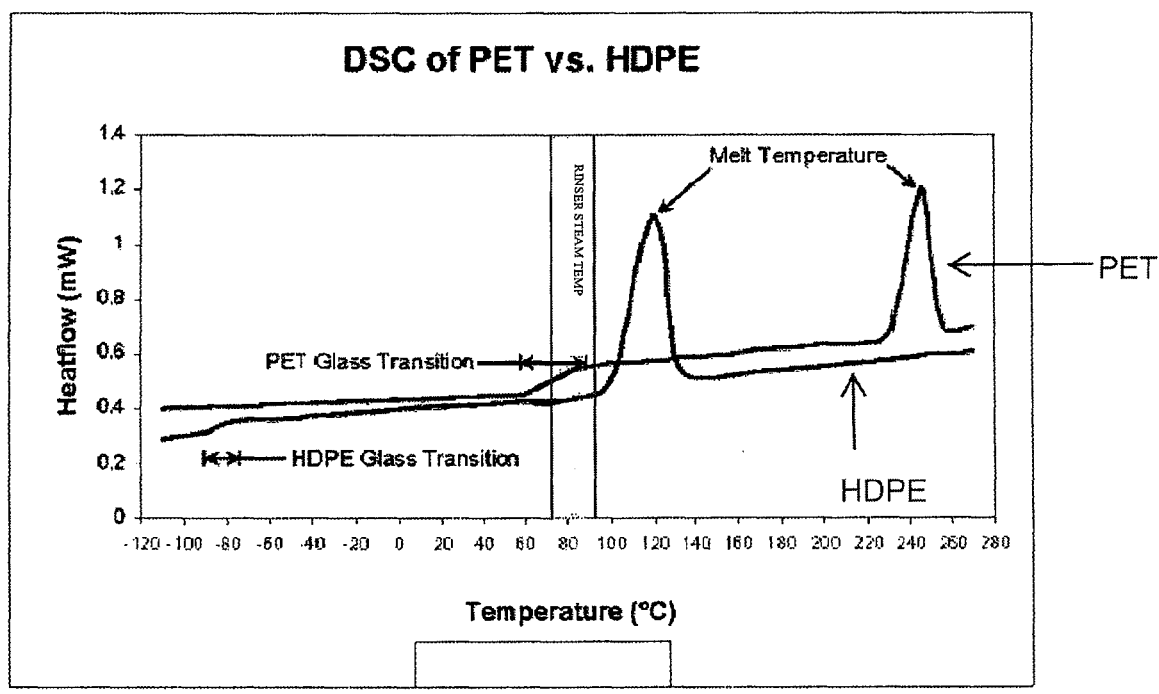
FIG. 8 is a graph illustrating the heatflow of PET and HDPE over a temperature range.
Figure 9:
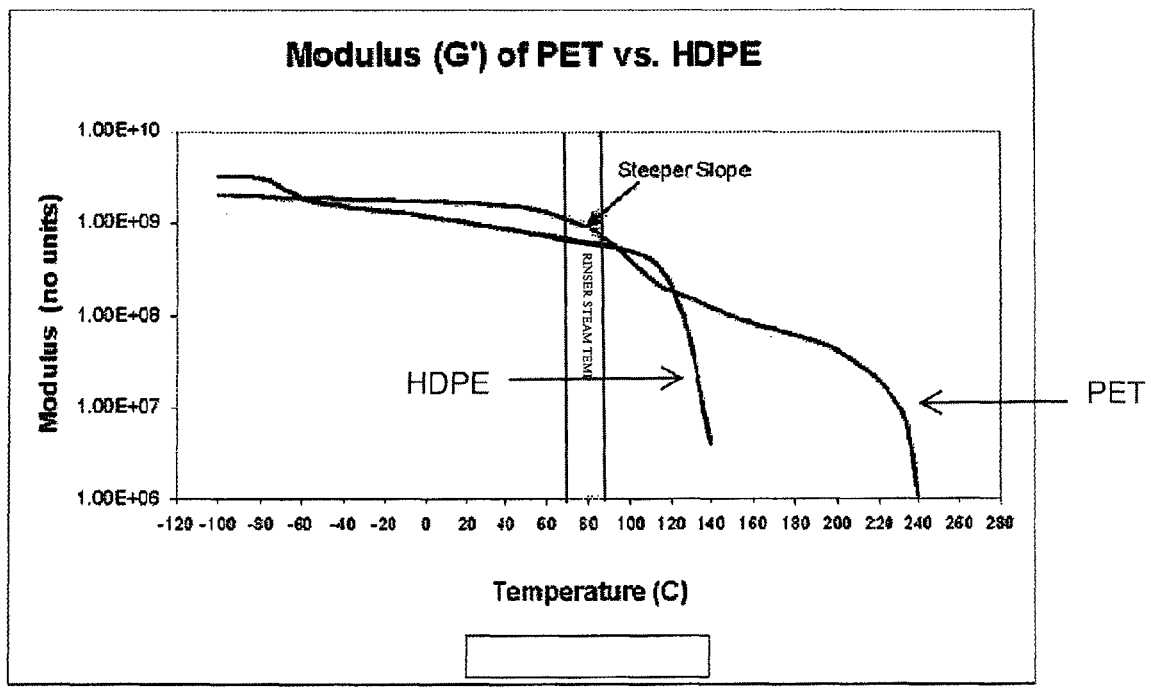
FIG. 9 is a graph illustrating the modulus of PET and HDPE over a temperature range.
Figure 10:
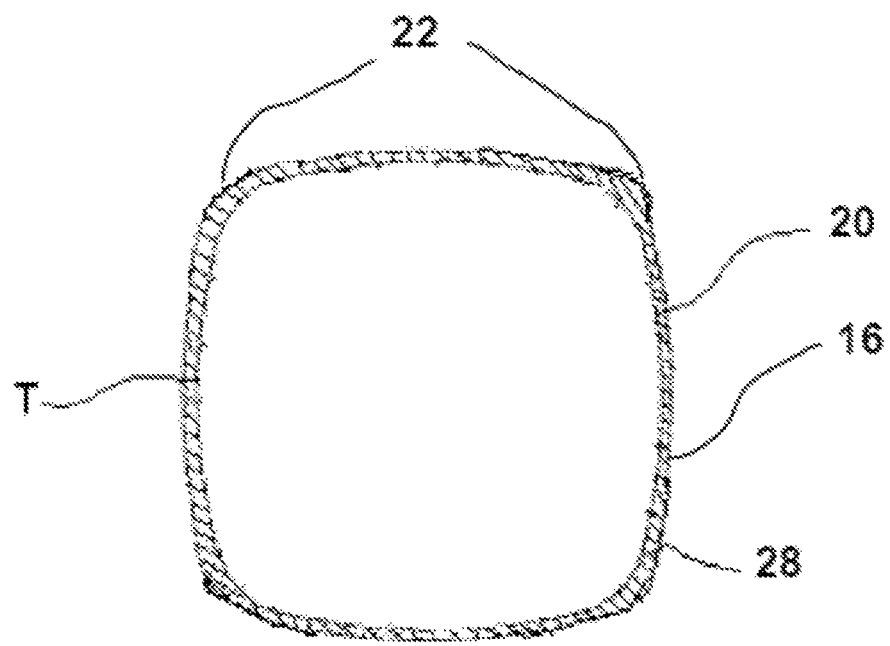
FIG. 10 is a is a cross-sectional view of the container shown in FIG. 3, taken along line B-B.

FIG. 10 is a cross-sectional view of the bottle 10 shown in FIG. 3, taken along line B-B. The cross-sectional view is approximately square shaped and has a thickness T. The thickness T of the side panel 26 may be between 0.010 inches and 0.050 inches in one embodiment, and may be between 0.015 inches and 0.030 inches in another embodiment. The average wall thickness may be 0.016 inches a PET bottle in one embodiment, and may be 0.028 inches for a HDPE bottle in another embodiment.

Figure 11:
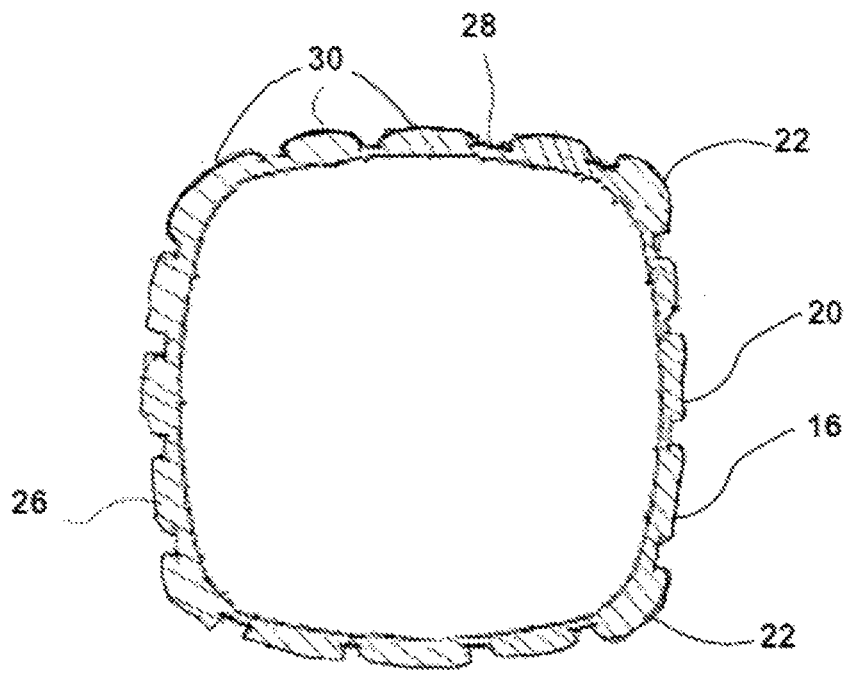
FIG. 11 is a cross-sectional view of the bottle shown in FIG. 3, taken along line C-C.
Figure 12:
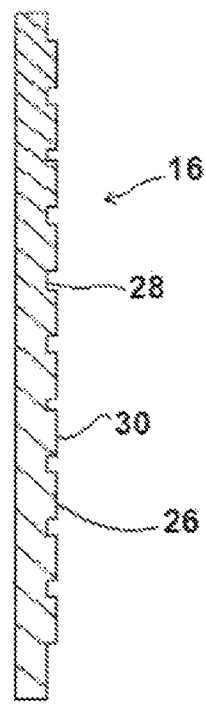
FIG. 12 is a cross-sectional view of the bottle shown in FIG. 3, taken along line D-D.

FIG. 11 is a cross-sectional view of the bottle 10 shown in FIG. 3, taken along line C-C. In FIG. 11, it can be seen how the ribs 26 extend further from the longitudinal axis A of the bottle 10 than the surfaces of the lands 28. FIG. 12 is a cross-sectional view of the bottle 10 shown in FIG. 3 taken along line D-D. FIG. 12 is vertical cross-sectional view and further illustrates how the ribs 26 extend further from the longitudinal axis A of the bottle 10 than the surfaces of the lands 28.

Figure 13:
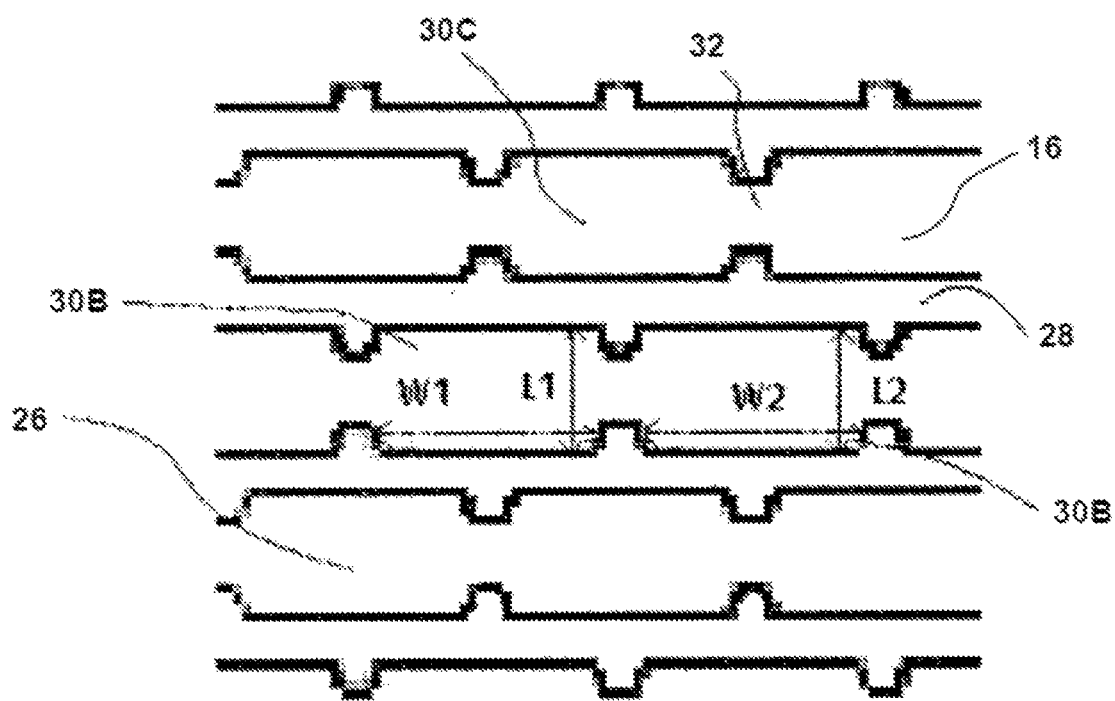
FIG. 13 is a close up view of the pattern shown on the bottle in FIG. 3.

FIG. 13 is a close up view of the brick like pattern of ribs 26 shown on the container in FIGS. 1-7 and is one example of such a brick pattern. The end of the enlarged portion 30A is located adjacent and proximate to an end of another enlarged portion 30B. In the pattern shown in FIG. 13, a bridge 28 connects the two enlarged portions 30A, 30B. In this embodiment, the length L1 of the first enlarged portion 30A is equal to the length L2 of the second enlarged portion 30B. In one embodiment, the lengths L1 and L2 may be 0.375 inches. Additionally, in the embodiment shown in FIG. 14, the width W1 of the first enlarged portion 30A is equal to the width W2 of the second enlarged portion 30B. In one embodiment, the widths W1 and W2 may be 0.735 inches. The center of one of the side edges of a third enlarged portion 30C is located above the position where the end of the first enlarged portion 30A is located adjacent and proximate to the end of the second enlarged portion 30B.

Figure 14:
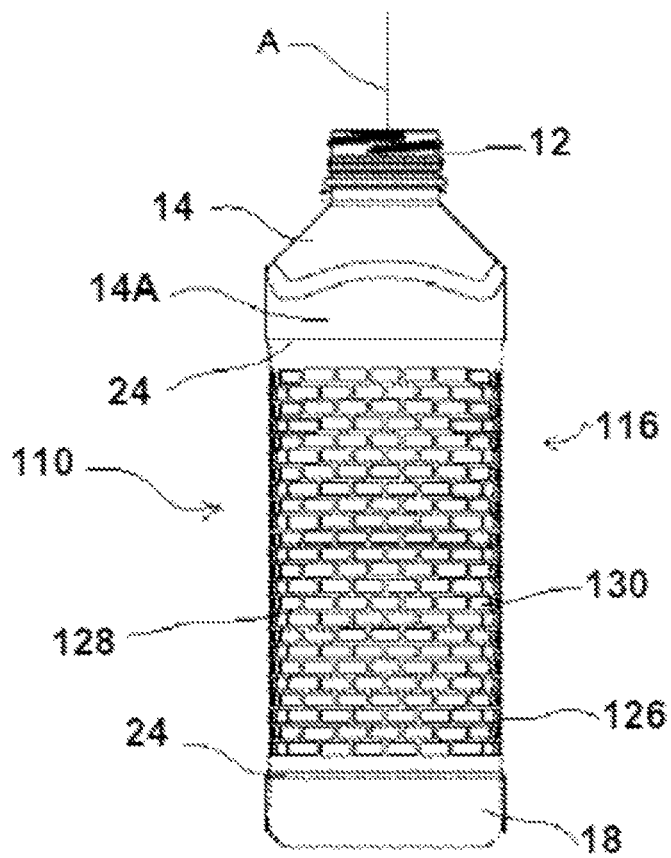
FIG. 14 is a front view of a bottle utilizing an alternative embodiment of the rib pattern in accordance with aspects of the present invention.
Figure 15:
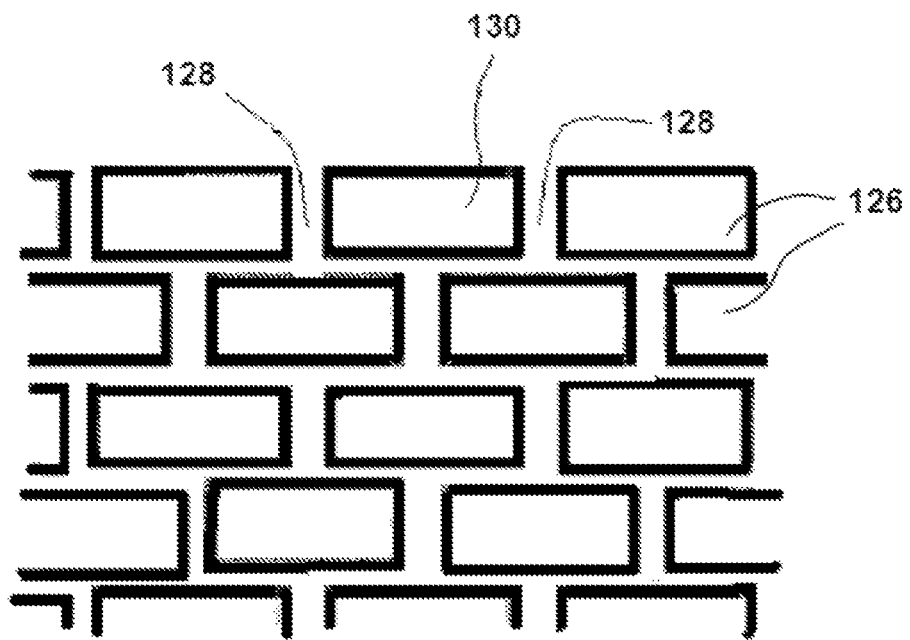
FIG. 15 is close up view of the pattern shown on the bottle in FIG. 14.

Now turning to FIGS. 14 and 15, wherein an alternative embodiment of a container 110 is shown. The container 110 has a sidewall 116 that has panels 120 having raised ribs 126 separated by recessed lands 128. The ribs 126 form a brick-like configuration or brick pattern similar to that which is shown in FIGS. 1-7 and 13 above, however there is no bridge 32 between the respective brick portions 130, and each of the brick portions 130 of each rib 126 are discrete and separate from each other. As with the bottle 10 discussed above, the ribs 126 extend further from the longitudinal axis A of the bottle than the surfaces of the lands 128. The ribs 126 are formed into horizontal rows. The ribs 126 provide increased strength to the panels 120 of the sidewall 116 of the bottle 110 and decrease deformation of the sidewall 116, as similarly described above. Other features of the bottle 110 may be similar to those described above with respect to the bottle 10. As similarly described above, in a further embodiment, the orientation of the embossed ribs 126 and the recessed lands 128 may be reversed, with the ribs 126 being recessed into the outer surface of the sidewall 116 and the lands 128 being raised above the ribs 126.

Figure 16:
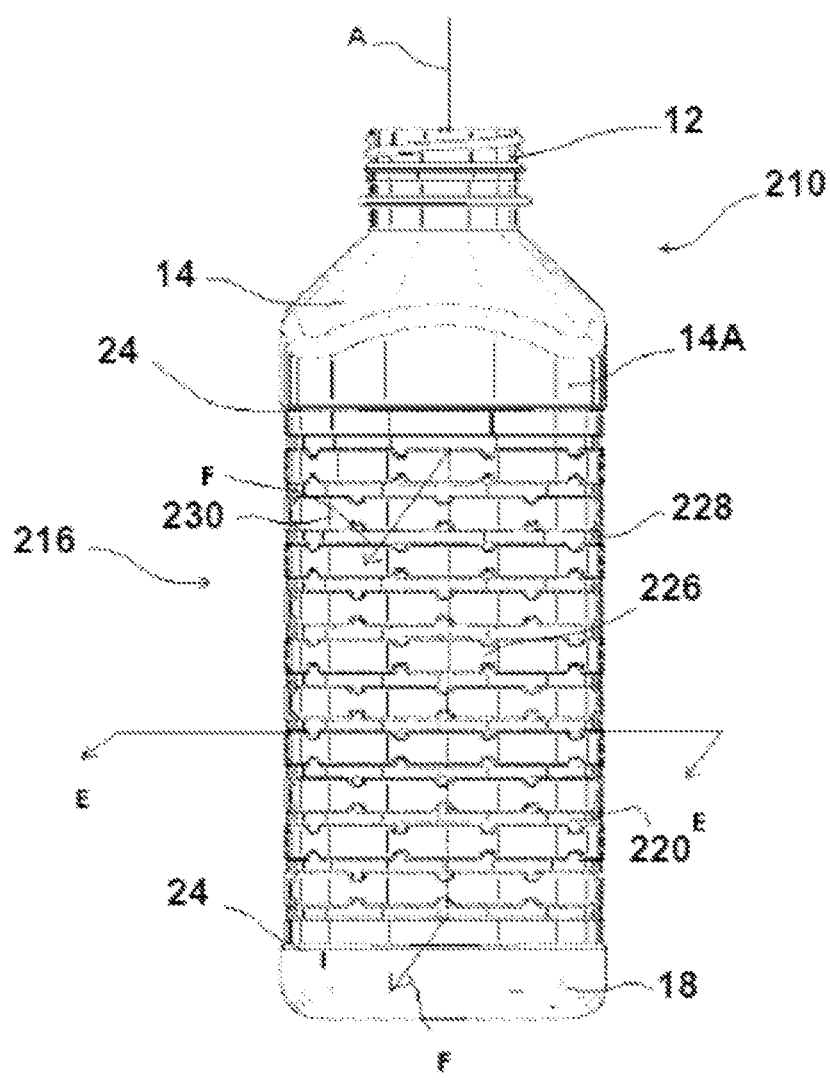
FIG. 16 is a front view of a bottle utilizing an alternative embodiment of the rib pattern in accordance with aspects of the present invention.

Now referring to FIGS. 16-19, wherein an alternative embodiment of a bottle 210 is shown. FIG. 16 is a front view of the bottle 210 utilizing an alternative embodiment of the rib pattern in accordance with an embodiment of the present invention. The container 40 has a sidewall 216 that has panels 220 wherein the ribs 226 are recessed from the lands 228 and are arranged in a brick pattern. The ribs 226 include recessed brick portions 230 connected by recessed bridges 232, as similarly described above with respect to the bottle 10 of FIGS. 1-7 and 10-13. The brick portions 230 and the bridges 232 have substantially the same peripheral shapes as the brick portions 230 and the bridges 32 of the bottle of FIGS. 1-7 and 10-13, and the brick portions 230 are generally rectangular in shape, as similarly described above.

Figure 17:
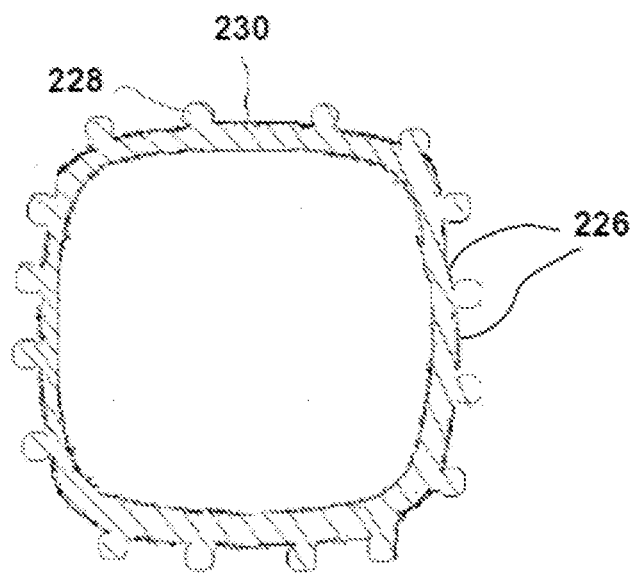
FIG. 17 is a cross-sectional view of the bottle shown in FIG. 16, taken along line E-E.
Figure 18:
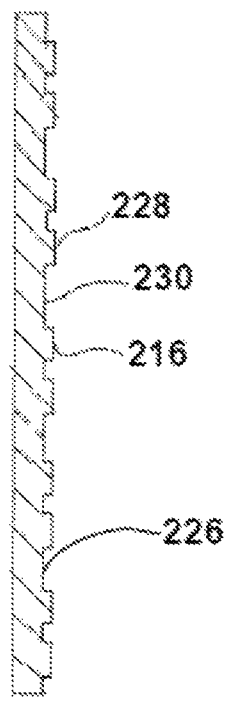
FIG. 18 is a cross-sectional view of the bottle shown in FIG. 16, taken along line F-F.

FIG. 17 is a cross-sectional view of the bottle 210 shown in FIG. 16, taken along line E-E. In the horizontal cross-section, the ribs 226 do not extend as far from the longitudinal axis A of the bottle 210 as the surfaces of the lands 228. The ribs 226 are formed into horizontal rows in this embodiment. The ribs 226 provide increased strength to the panels 220 of the sidewall 216 of the bottle 20 and decrease deformation of the sidewall 216, as similarly described above. FIG. 18 is a cross-sectional view of the bottle 210 shown in FIG. 16, taken along line F-F. As shown in FIG. 18, the vertical cross-section additionally shows that the ribs 226 do not extend as far from the longitudinal axis A of the bottle 210 as the surfaces of the lands 228.

Figure 19:
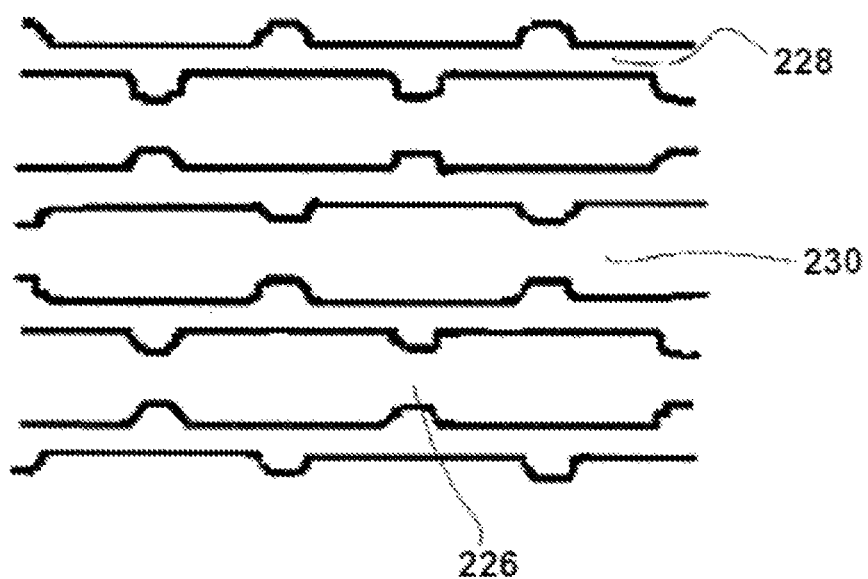
FIG. 19 is a close up view of the pattern shown on the bottle in FIG. 16.

FIG. 19 is a close up view of the arrangement of the ribs 226 shown on the bottle 210 in FIG. 16. The recessed ribs 226 form a brick-like configuration or brick pattern and reinforce the structural integrity of the sidewall 216, as similarly described above.

The bottle 10 is suitable for manufacture by blow molding processes, including stretch blow molding processes, but can also be manufactured using other processes. Additionally, the bottle 10 is suitable for use with PET and/or rPET materials, but can provide beneficial effects when manufactured from other materials, including HDPE and other polymer materials. Further, the bottle 10 is suitable for use for steam sterilization processes, including processes utilizing a WAB peroxide steam rinser, but can provide benefits in other applications as well. Still further, the bottle 10 is suitable for use in cold-fill applications, but may also be useful in hot-fill applications, as well as other applications. The bottles 110, 210 also described above may provide similar benefits.

The structural features of the bottle 10 shown in FIGS. 1-7, including at least the structure of the ribs 26 and/or other structures of the sidewall 16, provide sufficient strength and stability to the bottle 10 to enable the bottle 10 to be used in a steam sterilization process without unacceptable deformation of the bottle 10. Both the enlarged portions 30 and the bridges 32 assist in contributing to the strength and stability of the bottle 10 and in decreasing deformation of the panels 20 of the sidewall 16. In one embodiment, the panels 20 of the sidewall 16 are between 25% and 30% stiffer than the panels of a similar container having flat panels without ribs 26. In particular, the structure enables a bottle 10 made of PET (including rPET) be used in steam sterilization processes where the bottle 10 reaches temperatures in the range of 75-85° C. Prototypes of one embodiment of the bottle 10 made using at least some rPET have exhibited dimensional stability of less than 1% dimensional change during a steam sterilization process. Additionally, steam sterilization processes carried out on prototypes of the bottle 10 have shown superior bacteria kill rates during steam sterilization processes. It is thought that the internal geometry of the bottle 10 may cause increased turbulence of the sterilizing medium within the bottle 10, which may produce a greater kill rate than in other bottles. The bottles 110, 210 also described above may provide similar benefits.

Figure 20:
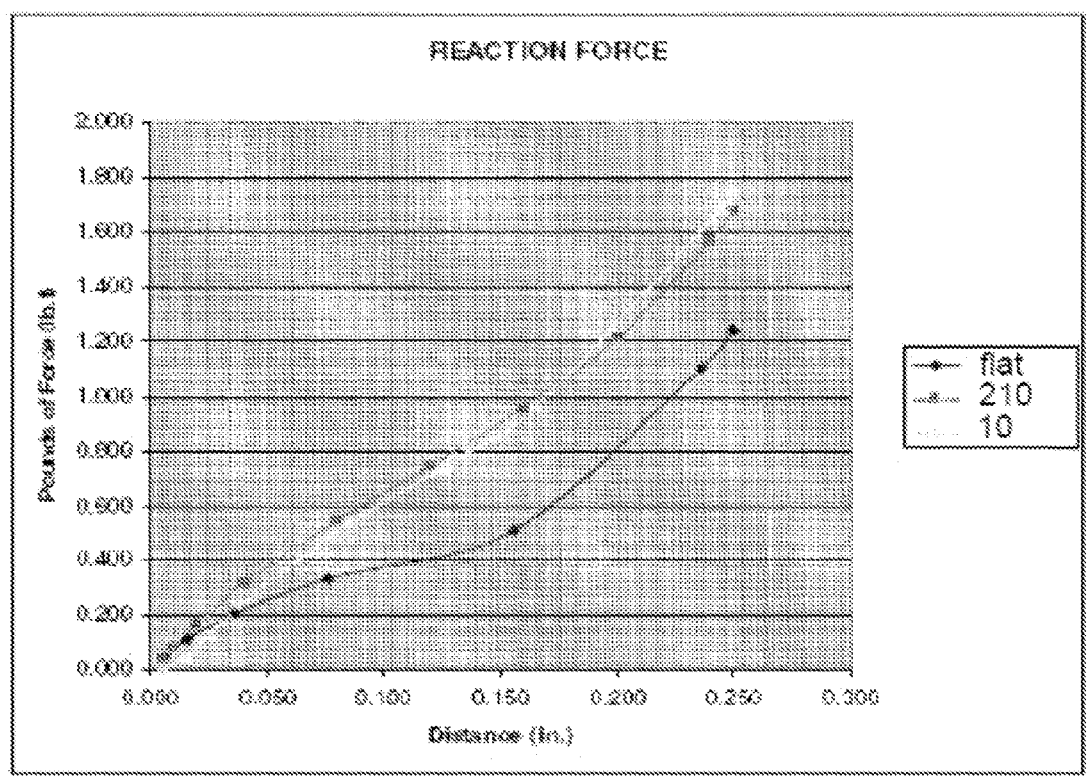
FIG. 20 is a graph illustrating the panel displacement analysis used in the deforming the side panels of a bottle.

FIG. 20 is a graph illustrating the panel displacement analysis of a container. The containers used in the analysis were blow molded. A ¼ inch of travel distance per side panel was applied in steps for non-linear analysis, based on an applied normal (i.e. perpendicular to the surface) force. The displacement force was measured and recorded during non-linear analysis. The average wall thickness was approximately 0.016 inches. The material properties were determined at ambient temperature. The graph illustrates the results of the test performed on embodiments of the bottles 10 and 110 described above, as well as another similar bottle having flat side panels with no ribs. With respect to the flat-panel bottle, the thickness of the panels of the sidewall was approximately 0.0160 inches and may generally be between 0.01 and 0.2 inches. With a normal force of 1.244 lbf applied to the center of the side panel, that side panel was pushed ¼ inch. With respect to the bottle 210, the thickness of the side panel 220 was approximately 0.0157 inches. The side panel 220 took a normal force of 1.676 lbf to push the side panel ¼ inch. With respect to the bottle 10, the thickness of the side panel 20 was approximately 0.0157 inches. The side panel 20 took a normal force of 1.750 lbf to push the side panel ¼ inch. In one embodiment, the side panels of a bottle according to the present invention require a minimum force of 1.5 lbf to push the side panel ¼ inch, and in another embodiment, the side panels of a bottle according to the present invention require a minimum force of 1.65 lbf to push the side panel ¼ inch. The graph illustrates how the side panels 20, 220 of the bottles 10, 210 yield very similar panel stiffness results, and both yield a 25-30% increase in rigidity and strength in view of the side panel of the flat-panel container.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A bottle comprising:
   a neck portion having an opening configured to permit filling and emptying of the bottle;
   a shoulder portion connected to a lower end of the neck portion;
   a sidewall connected to a lower end of the shoulder portion and extending vertically downward from the shoulder portion; and
   a base connected to a lower end of the sidewall and forming a bottom surface of the bottle,
   wherein the sidewall comprises a plurality of raised, annular ribs extending around a periphery of the sidewall, each of the annular ribs comprising a plurality of sequential enlarged portions interconnected by bridges, each of the enlarged portions having a vertical width that is greater than a vertical width of each of the bridges, each of the enlarged portions having a horizontal length that is greater than the horizontal length of each of the bridges, each of the bridges formed by opposing "U" shapes in top and bottom edges of the annular ribs, the transition from the enlarged portion to the bridge is substantially at a right angle, wherein a first rib of the plurality of ribs is staggered in relation to at least one immediately adjacent second rib of the plurality of ribs, such that the enlarged portions of the first rib are vertically offset from the enlarged portions of the second rib, and the bridges of the first rib are vertically offset from the bridges of the second rib, wherein each of the enlarged portions of the ribs is defined by a top edge and a bottom edge, wherein the top edges of the enlarged portions of the second rib define a first plane and the bottom edges of the enlarged portions of the first rib define a second plane, wherein the entire bottom edge of the first rib is located above the first plane and the entire top edge of the second rib is located below the second plane, and wherein the sidewall further comprises recessed lands separating adjacent annular ribs and located between the top and bottom edges of the adjacent annular ribs, wherein the enlarged portions and the bridges of each of the annular ribs form a raised surface with respect to the recessed lands.

2. The bottle of claim 1, wherein all of the plurality of ribs are arranged in an alternating, staggered arrangement, such that the enlarged portions and the bridges of each rib are vertically offset from the enlarged portions and the bridges of each adjacent rib.

3. The bottle of claim 2, wherein the plurality of ribs form a brick-like pattern.

4. The bottle of claim 1, wherein the enlarged portions of the ribs are generally rectangular in shape.

5. The bottle of claim 1, wherein the sidewall of the bottle has a generally square cross-section and is formed by four generally flat panels connected by four rounded corners.

6. The bottle of claim 5, wherein a thickness of each of the panels is between 0.01 and 0.02 inches, and wherein the bottle is configured such that when a normal force less than 1.65 lbf is applied to a center of a surface of at least one of the panels, the surface is not displaced at least ¼ of an inch toward a longitudinal axis of the container.

7. The bottle of claim 5, wherein the plurality of ribs are staggered, such that each rib of a first group of the ribs including the first rib has one of the enlarged portions vertically aligned with each of the four corners, and each rib of a second group of the ribs including the second rib has one of the bridges vertically aligned with each of the four corners, and wherein the first group of ribs and the second group of ribs are arranged in an alternating arrangement.

8. The bottle of claim 5, wherein all of the plurality of ribs are arranged in an alternating, staggered arrangement, such that the plurality of ribs form an alternating pattern at each of the four corners where the enlarged portions and the bridges of alternating ribs are vertically aligned with each respective corner.

9. The bottle of claim 1, wherein the enlarged portions of the first rib are vertically centered in relation to the bridges of the second rib and the enlarged portions of the second rib are vertically centered in relation to the bridges of the first rib.

10. The bottle of claim 9, wherein all of the plurality of ribs are arranged in an alternating, staggered arrangement, such that the enlarged portions and the bridges of each rib are vertically centered in relation to the bridges and the enlarged portions, respectively, of each adjacent rib.

11. The bottle of claim 1, wherein the bottle is manufactured using a blow molding process, from a material that includes at least some recycled PET, and is capable of exhibiting a dimensional stability of less than 1% dimensional change during a WAB steam sterilization process that reaches temperatures in the range of 75-85° C.

12. A bottle comprising:
a base comprising a lowermost surface of the bottle;
an opening proximate a top of the bottle, spaced vertically from the base, configured to permit filling and emptying of the bottle; and
a sidewall extending vertically upward at least a portion of a vertical distance from the base to the opening, the sidewall comprising four generally flat panel sections connected by four rounded corners;

wherein the sidewall comprises a plurality of raised, annular ribs extending around a periphery of the sidewall, each of the annular ribs comprising a plurality of sequential enlarged portions interconnected by bridges, each of the enlarged portions having a vertical width that is greater than a vertical width of each of the bridges, each of the enlarged portions having a horizontal length that is greater than the horizontal length of each of the bridges, each of the bridges formed by opposing "U" shapes in top and bottom edges of the annular ribs, and wherein a first rib of the plurality of ribs is staggered in relation to at least one adjacent second rib of the plurality of ribs, such that the enlarged portions of the first rib are vertically centered in relation to the bridges of the second rib and the enlarged portions of the second rib are vertically centered in relation to the bridges of the first rib, and such that first rib has one of the enlarged portions vertically aligned with each of the four corners and the second rib has one of the bridges vertically aligned with each of the four corners, wherein each of the ribs is defined by a top edge and a bottom edge, wherein the entire bottom edge of the first rib is located above the entire top edge of the second rib, wherein the sidewall further comprises recessed lands separating adjacent annular ribs and located between the top and bottom edges of the adjacent annular ribs, wherein the enlarged portions and the bridges of each of the annular ribs form a raised surface with respect to the recessed lands, and wherein the transition from the enlarged portion to the bridge is substantially at a right angle.

13. The bottle of claim 12, wherein all of the plurality of ribs are arranged in an alternating, staggered arrangement, such that the enlarged portions and the bridges of each rib are vertically offset from the enlarged portions and the bridges of each adjacent rib to form a bricklike pattern.

14. The bottle of claim 12, wherein the enlarged portions of the ribs are generally rectangular in shape.

15. The bottle of claim 12, wherein all of the plurality of ribs are arranged in an alternating, staggered arrangement, such that the enlarged portions and the bridges of each rib are vertically centered in relation to the bridges and the enlarged portions, respectively, of each adjacent rib, and such that the plurality of ribs form an alternating pattern at each of the four corners where the enlarged portions and the bridges of alternating ribs are vertically aligned with each respective corner.

16. The bottle of claim 12, wherein the bottle is manufactured using a blow molding process, from a material that includes at least some recycled PET, and is capable of exhibiting a dimensional stability of less than 1% dimensional change during a WAB steam sterilization process that reaches temperatures in the range of 75-85° C.

17. A bottle comprising:
a neck portion having an opening configured to permit filling and emptying of the bottle;
a shoulder portion connected to a lower end of the neck portion, the shoulder portion having a tapered configuration that tapers from a narrower top end with a generally circular cross-sectional shape to a wider bottom end with a generally square cross-sectional shape;
a sidewall connected to the lower end of the shoulder portion and extending vertically downward from the shoulder portion, the sidewall having a generally square cross-sectional shape comprising four generally flat panel sections connected by four rounded corners; and
a base connected to a lower end of the sidewall and forming a bottom surface of the bottle,
wherein the sidewall comprises a plurality of raised, annular ribs extending around a periphery of the sidewall, each of the annular ribs comprising a plurality of sequential, generally rectangular enlarged portions interconnected by bridges, each of the enlarged portions having a vertical width that is greater than a vertical width of each of the bridges, each of the enlarged portions having a horizontal length that is greater than the horizontal length of each of the bridges, each of the bridges formed by opposing "U" shapes in top and bottom edges of the annular ribs, wherein each of the enlarged portions of the ribs is defined by a top edge and a bottom edge, wherein the top edges of the enlarged portions of the second rib define a first plane and the bottom edges of the enlarged portions of the first rib define a second plane, wherein the entire bottom edge of the first rib is located above the first plane and the entire top edge of the second rib is located below the second plane, wherein the first rib and the second rib are immediately adjacent, wherein the enlarged portions and the bridges of each of the annular ribs form a raised surface with respect to recessed lands disposed between adjacent ribs, and
wherein all of the plurality of ribs are arranged in an alternating, staggered arrangement, such that the enlarged portions and the bridges of each rib are vertically centered in relation to the bridges and the enlarged portions, respectively, of each adjacent rib, and such that the plurality of ribs form an alternating pattern at each of the four corners where the enlarged portions and the bridges of alternating ribs are vertically aligned with each respective corner.

18. The bottle of claim 17, wherein the bottle is manufactured using a blow molding process, from a material that includes at least some recycled PET, and is capable of exhibiting a dimensional stability of less than 1% dimensional change during a WAB steam sterilization process that reaches temperatures in the range of 75-85° C.

19. A plastic bottle comprising:
a top portion;
a body comprising a plurality of panels located below the top portion;
a base located below the body; and
wherein at least one of the plurality of panels further comprises a first brick portion, a second brick portion and a third brick portion, and further wherein a first end of the first brick portion and a second end of the second brick portion are located proximate to each other, and a center portion of a top edge of the third brick portion is located below the first and second brick portions and proximate to the first end of the first brick portion and the second end of the second brick portions are located entirely above the top edge of the third brick portion,
wherein the first and second brick portions and the bridge are part of a first continuous rib extending around the bottle, and the third brick portion is part of a second continuous rib extending around the bottle, wherein the first continuous rib is separated from the second continuous rib by lands, and wherein the first continuous rib and the second continuous rib each further comprises a plurality of brick portions connected by a plurality of bridges, the brick portions having a greater vertical width than the bridges, wherein the bridges of the first continuous rib include a first bridge extending between the first end of the first brick portion and the second end of the second brick portion,
wherein each of the brick portions has a horizontal length that is greater than the horizontal length of each of the bridges, each of the bridges formed by opposing "U" shapes in top and bottom edges of the annular ribs, and
wherein transitions from the brick portions to the bridges are substantially at right angles.

20. The container of claim 19, wherein the lands are recessed with respect to the first and second ribs.

21. The container of claim 19, wherein the first and second ribs are recessed with respect to the lands.

* * * * *